United States Patent
Sung et al.

(10) Patent No.: US 11,657,074 B2
(45) Date of Patent: May 23, 2023

(54) SYSTEMS AND METHODS FOR DATABASE GEOCODING

(71) Applicant: VERIZON PATENT AND LICESING INC., Basking Ridge, NJ (US)

(72) Inventors: Kyle Chi Sung, Austin, TX (US); David John Mitchell, Austin, TX (US); Seth Nelson Milligan, Austin, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 245 days.

(21) Appl. No.: 16/823,786

(22) Filed: Mar. 19, 2020

(65) Prior Publication Data
US 2020/0218743 A1  Jul. 9, 2020

Related U.S. Application Data

(63) Continuation of application No. 15/295,671, filed on Oct. 17, 2016, now Pat. No. 10,621,214.
(Continued)

(51) Int. Cl.
| | | |
|---|---|---|
| G06F 16/29 | (2019.01) | |
| H04L 67/12 | (2022.01) | |
| H04L 69/22 | (2022.01) | |
| G01C 21/32 | (2006.01) | |
| G06Q 20/20 | (2012.01) | |
| G06Q 20/32 | (2012.01) | |
| G06F 16/28 | (2019.01) | |
| H04L 67/52 | (2022.01) | |
| H04L 67/56 | (2022.01) | |
| H04L 67/50 | (2022.01) | |
| H04L 67/566 | (2022.01) | |
| G06F 18/2321 | (2023.01) | |
| G06F 18/23213 | (2023.01) | |

(Continued)

(52) U.S. Cl.
CPC ............. *G06F 16/29* (2019.01); *G01C 21/32* (2013.01); *G06F 16/285* (2019.01); *G06F 18/2321* (2023.01); *G06F 18/23213* (2023.01); *G06F 18/24147* (2023.01); *G06N 7/01* (2023.01); *G06Q 20/20* (2013.01); *G06Q 20/3224* (2013.01); *H04L 67/12* (2013.01); *H04L 67/52* (2022.05); *H04L 67/535* (2022.05); *H04L 67/56* (2022.05); *H04L 67/566* (2022.05); *H04L 69/22* (2013.01)

(58) Field of Classification Search
CPC ......... G06F 16/285; G06F 16/29; H04L 67/56
See application file for complete search history.

(56) References Cited

U.S. PATENT DOCUMENTS

| | | |
|---|---|---|
| 9,514,155 B1 | 12/2016 | Majumdar |
| 2004/0266389 A1 | 12/2004 | Kennedy |

(Continued)

*Primary Examiner* — Vaishali Shah

(57) ABSTRACT

In an embodiment, a system can determine geocoded data from a database of geographic coordinates and metadata. The system correlates metadata, such as invoice data, to geolocation data, such as GPS or cellular data to determine geocoded data. The system further identifies one or more geographic coordinates for one or more location names, which may not have a corresponding metadata entry, by generating clusters of geographic coordinates. The clusters are then matched to one or location names using a matching algorithm. Accordingly, improved geocoded data may be determined.

20 Claims, 10 Drawing Sheets

Related U.S. Application Data

(60) Provisional application No. 62/241,939, filed on Oct. 15, 2015.

(51) Int. Cl.
    *G06F 18/2413*     (2023.01)
    *G06N 7/01*     (2023.01)

(56) References Cited

U.S. PATENT DOCUMENTS

| | | | |
|---|---|---|---|
| 2007/0087760 A1 | 4/2007 | Ogino et al. | |
| 2010/0114902 A1* | 5/2010 | Embley | G06F 16/81 707/741 |
| 2012/0226390 A1* | 9/2012 | Adams | G07C 5/008 701/1 |
| 2013/0054134 A1 | 2/2013 | Wang et al. | |
| 2013/0158866 A1* | 6/2013 | Weir | G01C 21/3617 701/468 |
| 2013/0226857 A1* | 8/2013 | Shim | H04W 4/029 706/52 |
| 2013/0289846 A1 | 10/2013 | Mitchell et al. | |
| 2015/0077276 A1 | 3/2015 | Mitchell et al. | |
| 2015/0081212 A1 | 3/2015 | Mitchell et al. | |
| 2015/0215325 A1 | 7/2015 | Ogawa | |
| 2015/0364118 A1* | 12/2015 | Dai | G06T 11/60 345/629 |
| 2016/0334227 A1* | 11/2016 | Davidson | G06Q 10/04 |
| 2016/0353245 A1 | 12/2016 | Kulikov | |
| 2018/0089051 A1 | 3/2018 | Nitsan et al. | |

\* cited by examiner

710 ⟶

Table After Driver A is Processed    712A

|  | Cluster 1 | Cluster 2 | Cluster 3 | Cluster 4 |
|---|---|---|---|---|
| Location Name 1 | 1 |  |  | 1 |
| Location Name 2 |  |  |  |  |
| Location Name 3 | 1 |  |  | 1 |

Table After Drivers A–C are Processed    712B

|  | Cluster 1 | Cluster 2 | Cluster 3 | Cluster 4 |
|---|---|---|---|---|
| Location Name 1 | 1/4 * 3 | 0 | 1/4 * 3 | 2/4 * 3 |
| Location Name 2 | 1/4 * 3 | 1/2 * 2 | 2/4 * 3 | 1/4 * 3 |
| Location Name 3 | 2/4 * 3 | 1/2 * 2 | 1/4 * 3 | 1/4 * 3 |

|  | Cluster 1 | Cluster 2 | Cluster 3 |
|---|---|---|---|
| Location Name 1 | (.8) | .2 | .2 |
| Location Name 2 | (.6) | .5 | .3 |
| Location Name 3 | (.5) | .2 | .4 |

|  | Cluster 1 | Cluster 2 | Cluster 3 |
|---|---|---|---|
| Location Name 1 | (.8) | .2 | .2 |
| Location Name 2 | .6 | (.5) | .3 |
| Location Name 3 | .5 | .2 | (.4) |

SYSTEMS AND METHODS FOR DATABASE GEOCODING

RELATED APPLICATIONS

This application is a continuation of U.S. patent application Ser. No. 15/295,671, filed Oct. 17, 2016, which claims priority to U.S. Provisional Application No. 62/241,939, filed on Oct. 15, 2015, the contents of which are incorporated herein by reference.

BACKGROUND

In the context of a geographic database, a street address may be mapped to a geographic coordinate, such as a latitude and longitude.

SUMMARY

In some embodiments, a method is disclosed for geocoding from a database of positional information. The method can include: receiving first data comprising a plurality of geographic coordinates and a plurality of first timestamps, wherein each geographic coordinate of the plurality of geographic coordinates corresponds to a timestamp of the plurality of first timestamps; receiving second data comprising a plurality of location names, wherein a first location name of the plurality of location names corresponds to a second timestamp; determining an association between a first geographic coordinate of the plurality of geographic coordinates and the first location name by correlating the plurality of geographic coordinates and the plurality of first timestamps with the second timestamp; generating a first marker comprising the first geographic coordinate and the first location name; determining a plurality of clusters from the plurality of geographic coordinates; determining a plurality of probabilities for each cluster of the plurality of clusters, wherein the plurality of probabilities for each cluster indicate a likelihood that a respective cluster corresponds to a marker; generating a second marker comprising a second geographic coordinate of one cluster of the plurality of clusters based at least on the probabilities for each cluster; and transmitting the first marker and the second marker to a device, wherein the method is performed by a computer hardware processor.

The method of the preceding paragraph can include one or more of the following features: The correlating of the plurality of geographic coordinates and the plurality of first timestamps with the second timestamp can further include: determining a correspondence between a first timestamp of the plurality of first timestamps and the second timestamp; and determining that the first geographic coordinate corresponds to the first timestamp. The determining of the correspondence between the second timestamp and the first timestamp can further include: determining a difference in time between the second timestamp and the first timestamp; and determining that the difference in time is within a time threshold. Determining the correspondence between the second timestamp and the first timestamp can further include: determining a first difference in time between the second timestamp and the first timestamp; determining a second difference in time between a third timestamp of the telematics timestamps and the first timestamp; and determining that the first difference in time is less than the second difference in time. The correlating of the plurality of geographic coordinates and the plurality of first timestamps with the second timestamp can further include: determining that a particular vehicle is stationary for a period of time at, at least one of, the first geographic coordinate or the second geographic coordinate. Each geographic coordinate of the plurality of geographic coordinates corresponds to one or more respective vehicles, and wherein determining the plurality of clusters can further include: determining a subset of the plurality of geographic coordinates based at least on some of the plurality of first timestamps that indicate a duration of time where a respective vehicle is stationary; determining a distance between a second geographic coordinate and a third geographic coordinate from the subset; determining that the distance is within a distance threshold; and generating a first cluster comprising the second geographic coordinate and the third geographic coordinate. The second data can further include a plurality of invoices, each invoice of the plurality of invoices corresponds to one or more respective vehicles, and wherein determining the plurality of probabilities for each cluster of the plurality of clusters can further include: determining, from at least some of the plurality of geographic coordinates and the one or more respective vehicles, a first number of invoices associated with the first cluster and a second location name of the plurality of location names; determining a total number of invoices associated with the first cluster; and generating a first probability based at least on the first number and the total number. The first probability can further include a relationship A between the second location name and the first cluster as: $A=T/S*C$, wherein T corresponds to the first number, S corresponds to the total number, and C is a total number of location names associated with the first cluster. The method can further include: determining an average geographic coordinate from at least some of the plurality of geographic coordinates; and generating a third marker that comprises the average geographic coordinate. The method can further include: matching, using the plurality of probabilities, each location name of the plurality of location names to one cluster of the plurality of clusters using a stable-marriage matching algorithm. The stable-marriage matching algorithm can include a Gale-Shapley algorithm. The device can be included in a vehicle. The first marker or second marker can be a stop on a route to be traveled by a vehicle.

In some embodiments, a system is disclosed for determining geographic locations from fleet vehicle operation information. The system can include a computer hardware processor. The computer hardware processor can be configured to: receive vehicle telematics data for a plurality of vehicles in a fleet of vehicles, the vehicle telematics data comprising geographic coordinates and telematics timestamps related to the plurality of vehicles; receive vehicle metadata for the plurality of vehicles, the vehicle metadata comprising vehicle stop timestamps and respective location names; determine a first marker by correlating, for two or more vehicles of the plurality of vehicles, the geographic coordinates and telematics timestamps with the vehicle stop timestamps and respective location names, the first marker comprising a first location name and a first geographic coordinate; and provide the first marker to a vehicle.

The system of the preceding paragraph can include one or more of the following features: The first marker can be a stop on a route to be traveled by the vehicle. The correlating can further include: determining a correspondence between a first timestamp of the telematics timestamps and a second timestamp of the vehicle stop timestamps; and determining that the first geographic coordinate corresponds to the first timestamp. Determining the correspondence between the second timestamp and the first timestamp can further include: determining a difference in time between the second timestamp and the first timestamp; and determining that the difference in time is within a time threshold. Determining the correspondence between the second timestamp and the first timestamp can further include: determining a first difference in time between the second timestamp and the first timestamp; determining a second difference in time between a third timestamp of the telematics timestamps and the first timestamp; and determining that the first difference in time is less than the second difference in time. The correlating can further include: determining, from some of the geographic coordinates and the telematics timestamps for a particular vehicle, determining that the particular vehicle is stationary for a period of time at the first geographic coordinate. The computer hardware processor can be further configured to: determine an average geographic coordinate from at least some of the geographic coordinates; and assign the average geographic coordinate to be the first geographic coordinate. The computer hardware processor can be further configured to: determine clusters of geographic coordinates from the geographic coordinates and telematics timestamps according at least to a duration of time where a respective vehicle from the plurality of vehicles is stationary; determine probabilities for each cluster of the clusters of geographic coordinates, wherein the probabilities for each cluster indicate a likelihood that the cluster corresponds to a marker; determine a second marker having a second geographic coordinate of one cluster of the clusters of geographic coordinates based at least on the probabilities for each cluster; and transmit the second marker to a vehicle of the plurality of vehicles as a stop on a route to be traveled by the vehicle.

In some embodiments, a system is disclosed for geocoding. The system can include a computer hardware processor. The computer hardware processor can be configured to: receive first data comprising a plurality of geographic coordinates; receive second data comprising a plurality of location names; determine a plurality of clusters from the plurality of geographic coordinates; determine a plurality of probabilities for each cluster of the plurality of clusters, wherein the plurality of probabilities for each cluster indicate a likelihood that a respective cluster corresponds to a location name of the plurality of location names; generate, based at least on the probabilities for each cluster, a first marker comprising a first geographic coordinate of one cluster of and a first location name; and transmit the first marker to a vehicle.

The system of the preceding paragraph can include one or more of the following features: The first marker can be a stop on a route to be traveled by the vehicle. Each geographic coordinate of the plurality of geographic coordinates corresponds to each timestamp of a plurality of first timestamps, each geographic coordinate of the plurality of geographic coordinates corresponds to respective one or more vehicles, and wherein determining the plurality of clusters can further include: determining a subset of the plurality of geographic coordinates based at least on some of the plurality of first timestamps that indicate a duration of time where a respective vehicle is stationary; determining a distance between a first geographic coordinate and a second geographic coordinate from the subset; determining that the distance is within a distance threshold; and generating a first cluster comprising the first geographic coordinate and the second geographic coordinate. The second data can include a plurality of invoices, each invoice of the plurality of invoices corresponds to one or more respective vehicles, and wherein determining the plurality of probabilities for each cluster of the plurality of clusters can further include: determining, from at least some of the plurality of geographic coordinates and the one or more respective vehicles, a first number of invoices associated with the first cluster and a second location name of the plurality of location names; determining a total number of invoices associated with the first cluster; and generating a first probability based at least on the first number and the total number. The first probability can further include a relationship A between the second location name and the first cluster as:

$$A = \frac{T}{S} * C,$$

wherein T corresponds to the first number, S corresponds to the total number, and C is a total number of location names associated with the first cluster. The computer hardware processor can be further configured to: match, using the plurality of probabilities, each location name of the plurality of location names to one cluster of the plurality of clusters using a stable-marriage matching algorithm. The stable-marriage matching algorithm can include a Gale-Shapley algorithm. A first location name of the plurality of location names corresponds to a second timestamp, each geographic coordinate of the plurality of geographic coordinates corresponds to a timestamp of a plurality of first timestamps, wherein the computer hardware processor can be further configured to: determine an association between a first geographic coordinate of the plurality of geographic coordinates and the first location name by correlating the plurality of geographic coordinates and the plurality of first timestamps with the second timestamp; and generate a second marker comprising the first geographic coordinate and the first location name. The correlating of the plurality of geographic coordinates and the plurality of first timestamps with the second timestamp can further include: determining a correspondence between a first timestamp of the plurality of first timestamps and the second timestamp; and determining that the first geographic coordinate corresponds to the first timestamp. The determining of the correspondence between the second timestamp and the first timestamp can further include: determining a difference in time between the second timestamp and the first timestamp; and determining that the difference in time is within a time threshold. Determining the correspondence between the second timestamp and the first timestamp can further include: determining a first difference in time between the second timestamp and the first timestamp; determining a second difference in time between a third timestamp of the telematics timestamps and the first timestamp; and determining that the first difference in time is less than the second difference in time. The correlating of the plurality of geographic coordinates and the plurality of first timestamps with the second timestamp can further include: determining that a particular vehicle is stationary for a period of time at, at least one of, the first geographic coordinate or the second geographic coordinate.

In some embodiments, a non-transitory computer storage medium for storing computer executable instructions that when executed by a computer hardware processor perform operations of any of the preceding paragraphs.

BRIEF DESCRIPTION OF THE DRAWINGS

The features of various embodiments disclosed herein are described below with reference to the drawings. Throughout the drawings, reference numbers are re-used to indicate correspondence between referenced elements. The drawings are provided to illustrate embodiments described herein and not to limit the scope thereof.

FIGS. 7A-7D illustrate example representations of geographic or geocoding data.

FIGS. 9A and 9B illustrate additional example representations of geocoding data during an example geocoding process.

DETAILED DESCRIPTION

Figure 1:
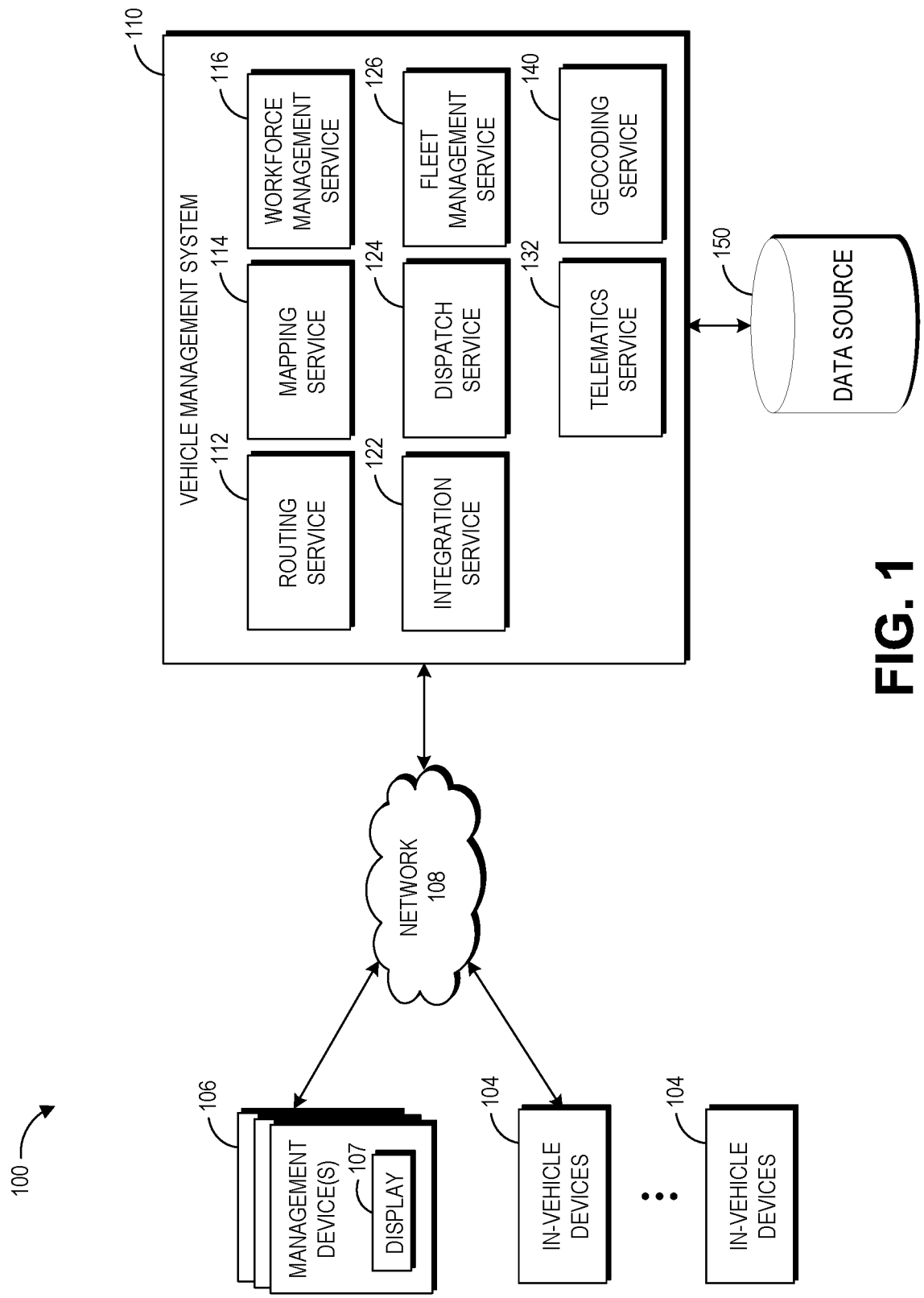
FIG. 1 illustrates an example computing environment including a vehicle management system and in-vehicle devices.

I. Geocoding from Vehicle Telematics Data and Metadata

Geocoding is the process of transforming a description of a location (for instance, an address, or a name of a place) into a location on the earth's surface (for instance, a geographic coordinate). In one example, an address or name of a location may be converted into a geographic coordinate, such as latitude and longitude coordinates.

Geocoding data may be used for efficient transportation, navigation, deliveries, fraud detection, or vehicle fleet management. For example, an address or name of a location can be selectively associated with one or more of multiple different geographic coordinates depending on a visitor to the address or name of the location. A geographic coordinate associated with the address of a building may, for instance, typically correspond to the front entrance of the building because a typical visitor to the building may desire to drive to the front entrance of the building to visit the building. Thus, if a typical visitor desires to navigate to the address of the building and provides the address of the building to a navigation device, the navigation device may route the typical visitor to the geographic coordinate for the front entrance to the building. On the other hand, if a visitor to the building is not a typical visitor but may instead be a delivery vehicle driver, the delivery vehicle driver may desirably be routed to the geographic coordinate of a loading area for the building rather than the front entrance when visiting the building.

The systems and methods described herein advantageously may, in certain embodiments, be used to determine and associate one or more locations with an address or name of a location. Each of the one or more locations can have a distinct functional purpose and thus may further be referred to as one or more functional locations. The one or more functional locations can desirably be useful for routing vehicles for purposes that are customized to a particular fleet of vehicles.

As described herein, one or more vehicles in a fleet of vehicles may include in-vehicle devices that compile vehicle telematics data. The vehicle telematics data may include geographic coordinates and timestamps, among other data, for the one or more vehicles. There may also be vehicle metadata associated with the one or more vehicles. One example of vehicle metadata is delivery metadata. Example delivery metadata may be obtained from delivery invoice data that may be associated with a particular driver and vehicle in the fleet. The delivery metadata may include location names and a time when the vehicle delivered an item to a respective location. In some instances, a time in the delivery metadata may be an approximation of the actual time when the delivery occurred. For example, a driver may not have created the delivery metadata at the time of delivery or the delivery time in the delivery metadata may be inaccurate due to an error, such as human error. As described herein, vehicle telematics data and vehicle metadata may be used for geocoding.

In some embodiments, pre-existing geocoded data may be of poor quality. For example, the geographic coordinates associated with refueling locations from fuel transaction data may not exist or may be hundreds of feet or miles away from the actual location. As described herein, methods for geocoding may be used to improve the geographic coordinates for refueling locations or be used for improved fraud detection, such as credit card fuel fraud. For example, the systems and methods described herein may be able to identify hundreds of refueling locations. The systems and methods may determine geographic coordinates that differ from the pre-existing data for a median distance of hundreds of feet and an average distance of thousands of feet. Moreover, geographic coordinates may be determined for thousands of markers that may not have had a successful registered delivery or for hundreds or thousands of markers that did not have an accurate geographic marker. For example, an unregistered delivery may correspond to delivery metadata that does not have a delivery timestamp associated with a particular location name.

One approach to geocoding can be to infer a geographic coordinate for a location by taking the delivery time from a delivery invoice and looking up the corresponding geographic coordinate from a Global Positioning System (GPS) unit in a vehicle for a single vehicle delivery. However, in some instances, the geographic coordinate from this geocoding approach may be inaccurate due to inaccuracies in the delivery time from the delivery voice. Moreover, the particular geographic coordinate may, in certain instances, only correspond to a single stop location at a destination where there may be multiple available stop locations, such as multiple parking spots around a building.

The systems and methods described herein may provide a geocoding solution that is based on multiple vehicle routes or may account for inaccuracies or the unavailability of some vehicle metadata.

II. Vehicle Management System

FIG. 1 illustrates an embodiment of a computing environment 100 for processing standardized vehicle operation information using a vehicle management system 110. Among other features, the example vehicle management system 110 shown includes a geocoding service 140 for determining geographic coordinates for one or more markers from vehicle telematics data or vehicle metadata. In the computing environment 100, one or more in-vehicle devices 104 and management devices 106 communicate with the vehicle management system 110 over a network 108. The in-vehicle devices 104 can include computing devices installed in fleet vehicles. These devices 104 can include navigation functionality, routing functionality, and the like. The in-vehicle devices 104 can receive route information and other information from the vehicle management system 110. In addition, the in-vehicle devices 104 can report information to the vehicle management system 110, such as driver location, vehicle sensor data, vehicle status (e.g., maintenance, tire pressure, or the like), and so forth. Vehicle management system 110 may receive data from an external data source 150. For example, the one or more external data sources 150 may include fuel transaction data, including geocoded data from fuel providers, data from the company that operates the fleet of vehicles (e.g., a lists of addresses, delivery destination names, driver invoices, or other vehicle metadata), or cellular network data (e.g., the phone data associated with drivers or cellular data associated with in-vehicle devices) from one or more data source providers.

The illustrated network 108 may be a LAN, a WAN, the Internet, combinations of the same, or the like. For ease of illustration, the vehicle management system 110 has been depicted as a centralized system or platform. However, in other implementations, at least some of the functionality of the vehicle management system 110 is implemented in other devices or in multiple servers or data centers. For example, the vehicle management system 110 can be implemented as software as a service (SaaS) in the cloud and may be located in multiple data centers around the world (or portion thereof). Other possible implementations of the vehicle management system 110 can include many more or fewer components than those shown in FIG. 1.

The management devices 106 can be computing and input/output (I/O) devices used by dispatchers, fleet managers, administrators, or other users to manage different aspects of the vehicle management system 110. For example, a user of a management device 106 can access the vehicle management system 110 to generate routes, dispatch vehicles and drivers, and perform other individual vehicle or fleet management functions. With the management devices 106, users can access and monitor vehicle information obtained from one or more of the in-vehicle devices 104 by the vehicle management system 110. Such vehicle status information can include data on vehicle routes used, stops, speed, vehicle feature usage (such as power takeoff device usage), driver behavior and performance, vehicle emissions, vehicle maintenance, energy usage, and the like. In some embodiments, the management devices 106 are in fixed locations, such as at a dispatch center. The management devices 106 can also be used by administrators in the field, and may include mobile devices, laptops, tablets, smartphones, personal digital assistants (PDAs), desktops, or the like. The management devices 106 can include a display 107 that can be used to display data quality as described herein.

The vehicle management system 110 can be implemented by one or more physical computing devices, such as servers. These servers can be physically co-located or can be geographically separate, for example, in different data centers. A server may include a hardware processor and memory. In one embodiment, the vehicle management system 110 is implemented as a cloud computing application. For instance, the vehicle management system 110 can be a cloud-implemented platform hosted in one or more virtual servers or physical servers accessible to users over the Internet or other network 108. In the depicted embodiment, the vehicle management system 110 includes a fleet management service 126, a mapping service 114, a telematics service 132, a routing service 112, a dispatch service 124, an integration service 122, and a geocoding service 140. These components can, but need not, be integrated together on a common software or hardware platform.

The fleet management service 126 can include functionality for generating, rendering, or otherwise displaying one or more vehicle management user interfaces. The vehicle management user interfaces can include a map or list of vehicles that depicts symbols or other data representative of vehicles. In addition, the vehicle management user interfaces can optionally include a history timeline display. For example, in response to user selection of one or more of the vehicle symbols from the map or list, the vehicle management user interface can output one or more vehicle history timelines corresponding to the selected vehicle or vehicles. Although the fleet management service 126 generates the user interface, in certain embodiments the fleet management service 126 outputs the user interface to the management devices 106, which actually display the user interface and associated history timeline display. Thus, as used herein, the terms "output a user interface for presentation to a user," "presenting a user interface to a user," and the like, in addition to having their ordinary meaning, can also mean (among other things) transmitting user interface information over a network, such that a user device can actually display the user interface.

The fleet management service 126 can communicate with the mapping service 114 to obtain mapping data, which the fleet management service 126 can include in the vehicle management user interface. The mapping data can be compressed, transmitted, re-rendered, and displayed on the management user interface. Other data can also be overlaid to enhance the map and management layout. The mapping service 114 can be a geographic information system (GIS) in one embodiment. The fleet management service 126 can also access the telematics service 132 to obtain vehicle status data for inclusion in vehicle history displays. The telematics service 132 can provide this vehicle status data based on telematics data obtained from the in-vehicle devices 104. The telematics data can include data such as location or speed information obtained using sequential GPS or cellular tower triangulation (or other methods), vehicle sensor data, solid state inertial information, or any other data that can be obtained from a vehicle, its engine, or the like (including other sensors such as passenger seat sensors to detect the presence of passengers and so forth).

The routing service 112 can construct pre-dispatch or post-dispatch routes for vehicles based on any of a variety of routing algorithms, such as those disclosed in U.S. Publication No. 2010/0153005, filed Dec. 8, 2009, and entitled "System and Method for Efficient Routing on a Network in the Presence of Multiple-Edge Restrictions and Other Constraints," the disclosure of which is hereby incorporated by reference in its entirety. In addition, the routing service 112 can automatically select routes that take into account factors that affect energy usage using the techniques described in U.S. application Ser. No. 12/954,547, filed Nov. 24, 2010, and entitled "Vehicle Route Selection Based on Energy Usage," the disclosure of which is hereby incorporated by reference in its entirety.

The integration service 122 can facilitate integration of the vehicle management system 110 with other systems, such as fuel card systems, payroll systems, supply chain system, insurance systems, and the like. For example, the integration service 122 may receive data from the one or more data sources 150. The dispatch service 124 can provide functionality for users of the management devices 106 to assign drivers and vehicles to routes selected by the routing service 110.

In the depicted embodiment, the vehicle management system 110 includes a telematics service 132, which may be implemented in software. Telematics service 132 that can receive and analyze vehicle data to provide vehicle operation information and configure the collection of measurement data related to the operation of fleet vehicles.

The telematics service 132 can obtain and receive measurement data related to vehicles and fleets of vehicles via telematics data received from the in-vehicle devices 104. The telematics data can include data such as location or speed information obtained using GPS or cellular tower triangulation (or other methods), vehicle sensor or diagnostic data, solid-state inertial information, or any other data that can be obtained from a vehicle, its engine, or the like (including other sensors such as passenger seat sensors to detect the presence of passengers and so forth). Examples of specific measurements that can be obtained for some fleet vehicles include A/C System Refrigerant Monitor, Alternator Voltage, Brake Indicator Light, Coasting Time, Engine Oil Level, Fuel Level, Hydraulics On, Odometer, Rear Door, Tire Pressure, Total Fuel Used, and Turn Signal Status. Other examples of specific measurements are described below with respect to FIG. 2. In some implementations, telematics data can be additionally or alternatively received from one or more other sources, for example, such as directly from other components of the vehicle, via manual data entry to a user interface (e.g., by the driver), or a server configured to receive and store fleet vehicle operation measurements.

Because a vehicle fleet may include vehicles having different makes, models, and or model years having different operation reporting capabilities (e.g., providing direct measurements or one or more indirect measurements of vehicle operations information), the data available to the telematics service 132 can be different for some vehicles of the vehicle fleet than for other vehicles. In one example, if a vehicle fleet includes both light-duty vehicles, such as commuter vehicles, and heavy-duty vehicles, such as semi-trailers, the light-duty and heavy-duty vehicles can report different operation measurements usable for understanding the operation of the vehicles. The heavy-duty vehicles and one group of the light-duty vehicles can, for instance, maintain an odometer measurement readable by the in-vehicle devices 104. The odometer measurement can be provided by the in-vehicle 104 to the telematics service 132. On the other hand, another group of light-duty vehicles in the vehicle fleet may not be capable of outputting odometer measurements readable by the in-vehicle devices 104. Instead, the drivers of the vehicle may be expected to manually read the odometer measurements and provide the measurements with corresponding timestamps for input to the telematics service 132.

Because the accuracy or precision of measurements can vary significantly depending on the source, timing, sophistication, or the like for the measurements, the measurements obtained by the telematics service 132 can be associated with one or more indications of the quality of the measurements. The telematics service 132 can assign a value from multiple values that corresponds to the level of quality for one or more measurements. This assignment can be based on the source of information, age of information, precision of information, estimated accuracy of information, or the like. Additionally or alternatively, the telematics service 132 can receive the measurements and one or more indications of the quality of the measurements from the in-vehicle devices 104. Moreover, in some embodiments, the one or more indications of the quality of the measurements can be utilized by the telematics service 132 to manage or process the measurements. For instance, the telematics service 132 can request or discard certain measurements related to particular vehicles in the vehicle fleet based on the one or more indications of the quality.

III. In-Vehicle Devices

Figure 2:
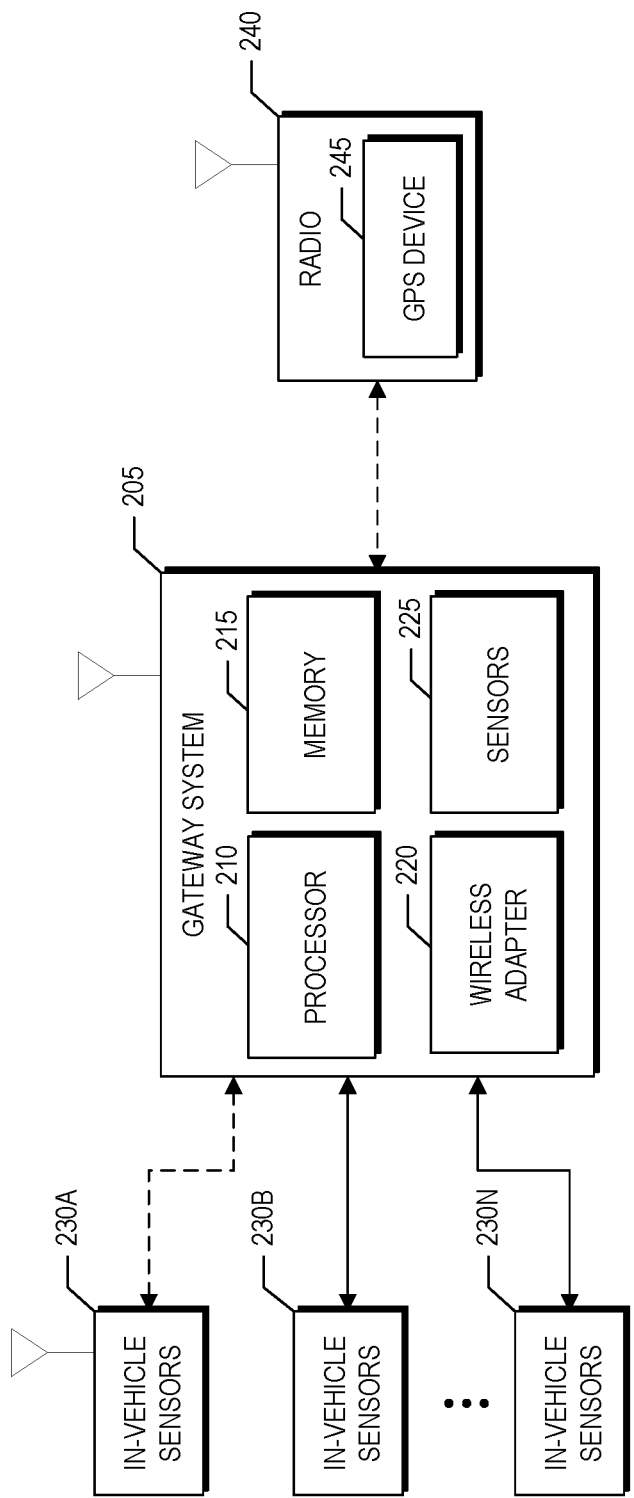
FIG. 2 illustrates an example in-vehicle device.

FIG. 2 illustrates an embodiment of a gateway system 205. The gateway system 205 is a more detailed embodiment of an in-vehicle device 104 described above and includes all the features thereof. The gateway system 205 can be a vehicle based data acquisition and transmission sub-system. In the depicted embodiment, the gateway system 205 has a hardware processor 210, memory 215, a wireless adapter 220, and one or more sensors 225. In some embodiments, the sensors 225 are omitted. The sensors 225 can be configured to measure vehicle data, such as vehicle position, temperature, time, acceleration, audio, and direction.

A radio 240 communicates with the gateway system 205, either wirelessly or through a wired connection (e.g., with a serial cable or the like). The radio 240 includes a GPS device 245 that detects vehicle position. The radio 240 can transmit data received from the gateway system 205 to the vehicle management system 110. The radio 240 can also communicate vehicle positioning data received from the GPS device 245 to the vehicle management system 110. In one embodiment, the radio 240 communicates with the vehicle management system by placing a cell phone call to a server of the vehicle management system 110. The radio 240 can also communicate with the server at the vehicle management system 110 by connecting to the network 108 using TCP/IP/UDP protocols. By sending data frequently or periodically, the radio 240 can maintain the connection to the server open, which can guarantee or help to guarantee data reliability.

Any number of in-vehicle sensors 230 located within the vehicle can communicate with the gateway system 205. The in-vehicle sensors 230 can be located throughout the vehicle, including, for example, the engine, tires, vehicle body, trailer, cargo areas, and other locations on and within the vehicle. Some examples of vehicle sensors include engine oil sensors, fuel level sensors, light sensors, door sensors, ignition sensors, temperature sensors (including in cab and in trailer), and tire pressure sensors. At least some of the in-vehicle sensors 230 can communicate with the engine computer or other engine hardware configured to receive and process the data. The in-vehicle sensors can also be located remotely and can transmit the data wirelessly to the engine computer or other data processing hardware. For example, a tire pressure sensor could wirelessly transmit tire pressure data to the engine computer for processing.

Likewise, the gateway system 205 can also include sensors. One example of a sensor 225 that may be included in the gateway is an accelerometer. An accelerometer can detect hard braking, cornering, and acceleration. The accelerometer can therefore allow position coordinates to be updated without resort to GPS or triangulation technology. For example, the accelerometer can provide for short-term position reporting that operates without resorting to GPS signals. The gateway system 205 can offer a low cost longitude, latitude capability and combined hard braking sensor for vehicle history applications, such as the vehicle history systems and methods described in U.S. application Ser. No. 13/251,129, titled "History Timeline Display for Vehicle Fleet Management," filed Sep. 30, 2011, the disclosure of which is hereby incorporated by reference in its entirety. As a device, in certain embodiments, the gateway system 205 can enable data from multiple sensors to be acquired without adding wires or optical connections.

The gateway system 205 can be in communication with some or all of the in-vehicle sensors 230. For example, the gateway system 205 can be coupled to an OBDII or CAN bus in the vehicle to thereby receive in-vehicle sensor information from the engine computer. In some embodiments, one or more in-vehicle sensors can be directly coupled to the gateway system 205, or the gateway system 205 can be configured to communicate wirelessly with the in-vehicle sensors. For example, the gateway system could receive cargo bay temperature data from a temperature sensor wirelessly transmitting the data. The wireless sensors can use point-to-point custom wireless transmission or using wireless transmission standards such as Bluetooth or Zigbee.

The processor 210 and memory 215 of the gateway system 205 can implement various features. The processor 210 of the gateway system 205 can control the functioning of the gateway system 205. The gateway system 205 can act as an intermediary processing platform for the vehicle management system 110. The gateway system 205 can process the data received from the in-vehicle sensors 230 and send a subset of the total data collected to the vehicle management system 110. The gateway system 205 can collect hundreds or thousands or more data points from sensors 225, in-vehicle sensors 230, and the engine computer. The gateway system 205 can, among other things, analyze, categorize, compress, or otherwise process the data before transmitting it to the vehicle management system 110. By preprocessing the data prior to sending the information to the vehicle management system 110, the gateway system 205 can determine what data to send to the vehicle management system 110, which can reduce redundant processing and bandwidth used to continually transmit vehicle data.

In some embodiments, the measurements determined by the sensors 225, in-vehicle sensors 230, or the engine computer can, for example, include one or more of the following: A/C System Refrigerant Monitor, ABS Active Lamp, Abnormal Refrigerator Temperature, Acceleration Violations, Accelerator Pedal Position, Air Inlet Temperature, Airbag Light, Alternator Current, Alternator Voltage, Amber Warning Lamp (DM1), Ambient Air Temperature, Ammonium Nitrate Grand Total, Antitheft System Active, Asset Power, Auto Lube Alarm, Average Fuel Economy, Backup Battery Voltage, Barometric Pressure, Battery Charge, Battery Voltage, Belly Dump, Boom Status, Brake Indicator Light, Brake Pedal Switch, Cab Interior Temperature, Cargo Air Temperature, Catalyst Monitor, Check Fuel Cap, Coasting, Coasting Time, Comprehensive Component Monitor, Coolant Hot Light, Coolant Level, Coolant Pressure, Cruise Control Set Speed, Cruise Control Status, Deceleration Violations, Defroster, Diagnostics Scan Tool Connected, Diesel Particulate Filter Status, Diesel Pump, Driver Door, Dump Arm, EGR System Monitor, Emulsion Grand Total, Emulsion Job Total, Engine Coolant Pressure, Engine Coolant Temperature, Engine Load, Engine Oil Level, Engine Oil Pressure, Engine Oil Temperature, Engine Speed, Engine Start Event, Engine Stop Event, Evaporative System Monitor, Failure Mode Identifier (DM1), Flash Amber Warning Lamp (DM1), Flash Malfunction Indicator Lamp (DM1), Flash Protect Lamp (DM1), Flash Red Stop Lamp (DM1), Fuel Level, Fuel Oil Grand Total, Fuel Oil Job Total, Fuel Rate, Fuel Remaining, Fuel System Monitor, Fuel Temperature, Gasoline Pump, Harsh Acceleration, Harsh Braking, Heated Catalyst Monitor, High Engine Temperature, High Wind Speed, Hopper #1-4, Hydraulic Fluid Temperature, Hydraulic Pressure, Hydraulics On, Idle Time, Ignition, In Cradle, J1939 DTC, Lift, Lights, Low Brake Fluid, Low Engine Oil Pressure, Low Fuel Level, Low Tire Pressure, Low Wind Speed, Malfunction Indicator Lamp Status (DM1), Max Acceleration, Max Deceleration, Misfire Monitor, Net Battery Current, OBDII DTC, Occurrence Count (DM1), Odometer, Oil Life Remaining, Oil Pressure Lamp, Oxygen Sensor Heater Monitor, Oxygen Sensor Monitor, PTO, Panic, Passenger Door, Pony Motor Running, Protect Lamp Status (DM1), RSSI, Raining, Rear Door, Red Stop Lamp Status (DM1), Refrigeration Temperature, Refrigeration Temperature 2, Reserved For Future Use, SPN Conversion Method (DM1), Seatbelt Fastened, Seatbelt Warning Light, Secondary Fuel Level, Service Trashcan, Side Door, Speeding Over Max, Suspect Parameter Number (DM1), Sweeper Engine, Tires 1-12 Pressure, Tires 1-12 Sensor ID, Tires 1-12 Temperature, Total Engine Time, Total Fuel Used, Total Idle Fuel Used, Total Idle Fuel Used, Total Idle Hours, Total PTO Time, Total Vehicle Time, Track Motor, Trailer Coupled, Transmission Fluid Temperature, Transmission Gear, Transmission Oil Level, Trip Distance, Trip Duration, Trip Fuel Used, Trip Fuel Used Idling, Trip Max Vehicle Speed, Trip Time At Full Throttle, Trip Time Driving Without Seatbelt, Trip Time In Optimal RPM Range, Trip Time Speeding, Trip Time With Cruise Control On, Trip Time With RPM High, Turn Signal Status, Vehicle Loaded, Vehicle Speed, Washer Fluid Level, Water In Fuel, Welder, or iButton Driver Id Event.

The gateway system 205 can monitor several vehicle characteristics. The sensors 225, 230 can provide information to the gateway system 205 at a specific frequency for each vehicle characteristic; however, the sensors 225, 230 may generally be recording data at a faster rate than the monitored vehicle characteristic is changing. As such, sending all of the data to the vehicle management system 110 every time a sensor provides data can waste bandwidth and provide redundant data points for the vehicle management system 110 to process. Advantageously, in certain embodiments, instead of sending all of this data to the vehicle management system 110, the gateway system 205 processes the data and selectively updates the vehicle management system 110. The gateway system 205 can also compress the data that is received. The gateway system 205 can selectively compress portions of the data using wavelet transforms or other compression techniques, including any lossy or lossless compression techniques. For example, the data relating to vehicle characteristics that are slowly changing can be compressed.

The gateway system 205 can process vehicle characteristics according to the rate at which the characteristics change. For example, engine characteristics can range from relatively slower changing characteristics, such as tire pressure or average fuel consumption, to relatively faster changing characteristics, such as engine RPM and speed. The gateway system 205 can provide updates to the vehicle management system 110 using different update approaches for each vehicle characteristic, including periodic updates, threshold-based updates, event-based updates, user-specified updates, or a combination of methods.

Periodic updates can provide updates to the vehicle management system at a specified frequency. For example, the gateway system 205 may update the remaining vehicle fuel data every 5 minutes. Threshold based updates can provide updates when the value of the vehicle characteristic meets or exceeds a specified threshold. The thresholds can be static, determined dynamically by the system, user specified, or determined using any other method. The thresholds can be absolute, such as a specific value, or relative, such as a percentage based change a specific number of units. For example, tire pressure data could be updated when the tire pressure changes by 10%, or when it changes by 2 psi, or if pressure drops below 35 psi. Event-based updates can prompt updates after a specific event occurs. For example, an update of all the vehicle characteristics may be provided when the engine starts or when an engine error is detected.

The gateway system 205 can use a combination of methods or algorithms to determine the frequency of the updates to the vehicle management system 110. For example, the tire pressure data could have a periodic update and a threshold based update. The tire pressure data could be updated every 30 minutes. However if there was a blowout, it can be beneficial to have a more rapid or immediate update to the tire pressure. As such, the gateway system 205 could evaluate the tire pressure against a threshold that updates tire pressure when a change is detected. The gateway system 205 can provide update routines that are dependent on the operational phase of the vehicle, such as warm-up operation versus normal operation. As engine conditions stabilize after warm-up the gateway system 205 can increase the intervals at which updates are provided to the vehicle management system 110. In some embodiments the gateway system 205 can send the updated data to the vehicle management system 205 and the raw data. The raw vehicle data can include some or all of the data that the gateway system 205 receives from the sensors and vehicle computer. The raw data can be transmitted with or without the preprocessed updated vehicle data.

More generally, in certain embodiments, the gateway system 205 can be a system that performs wired or wireless data acquisition within a vehicle. The gateway system 205 can pool data from various sensors, apply time stamps to the data, reformat the data, encode the data, or encrypt the data. Software running on the gateway system 205 can manage data acquisition and data formatting. The gateway system 205 can therefore acquire diagnostic bus and motor vehicle status data and buffer the data and forward the data directly to the vehicle management system or another in-vehicle device (such as a driver's cell phone, tablet, or laptop) via WiFi, Ethernet, RS232/422, USB, or other suitable physical interfaces.

IV. Data Quality Service

Figure 3:
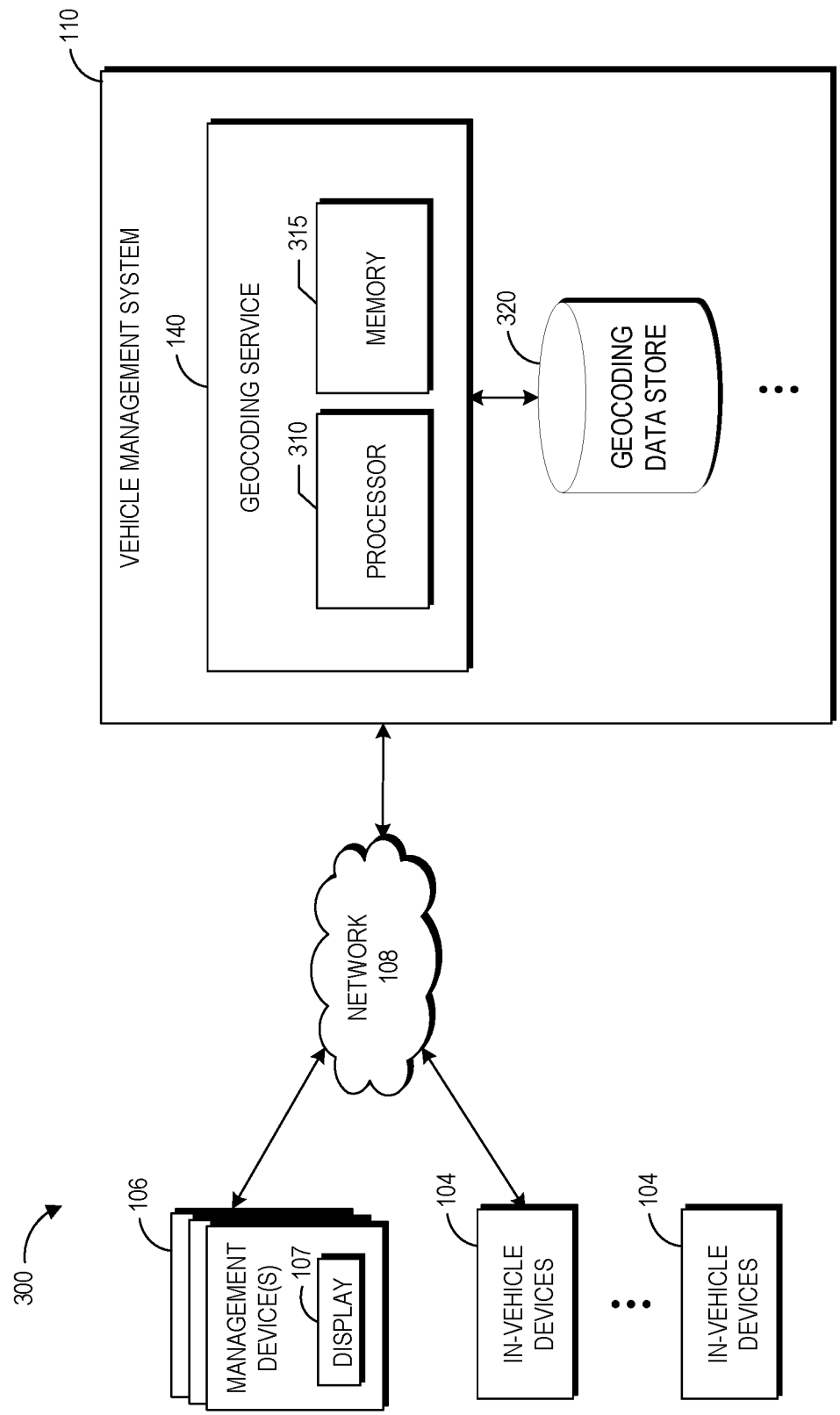
FIG. 3 illustrates an example geocoding service.

FIG. 3 illustrates an embodiment of a geocoding service 140 in the context of a computing environment 300. The computing environment 300 may be similar to the computing environment 100 of FIG. 1. For example, the in-vehicle devices 104, the vehicle management system 110, and other components of FIG. 3 may be similar to the devices, systems, and other components of FIG. 1. In particular, while not illustrated, the vehicle management system 110 of FIG. 3 may include the services described with respect to the vehicle management system 110 of FIG. 1. Further, the embodiment vehicle management system 110 of FIG. 3 includes the geocoding service 140 and the geocoding data store 320, as described herein, which may communicate with other services and devices of the vehicle management system 110.

In the depicted embodiment, the geocoding service 140 has a processor 310 (also referred to herein as a hardware processor) and a memory 315. The processor 310 and memory 315 of the geocoding service 140 can implement various features. The processor 310 can control the functioning of the geocoding service 140. The geocoding service 140 can act as a processing platform for the vehicle management system 110. The geocoding service 140 can process the data received from the in-vehicle sensors 230 and determine geographic coordinates for one or more markers from vehicle telematics data or vehicle metadata. The geocoding service 140 can process hundreds or thousands or more data points from the in-vehicle sensors 230. The geocoding service 140 can, among other things, analyze, categorize, or otherwise process the data for use by the vehicle management system 110, as described herein. The determined data, such as the determined geocoded data, may be stored in the geocoding data store 320.

The geocoding data store 320 may be embodied in hard disk drives, solid state memories, any other type of non-transitory computer-readable storage medium, and/or a file, a database, an object orientated database, document store, a relational database, in-memory cache, and/or stored in any such non-transitory computer-readable media accessible to the geocoding service 140. The geocoding data store 320 may also be distributed or partitioned across multiple local and/or remote storage devices without departing from the spirit and scope of the present disclosure.

V. Geocoding Process

Figure 4:
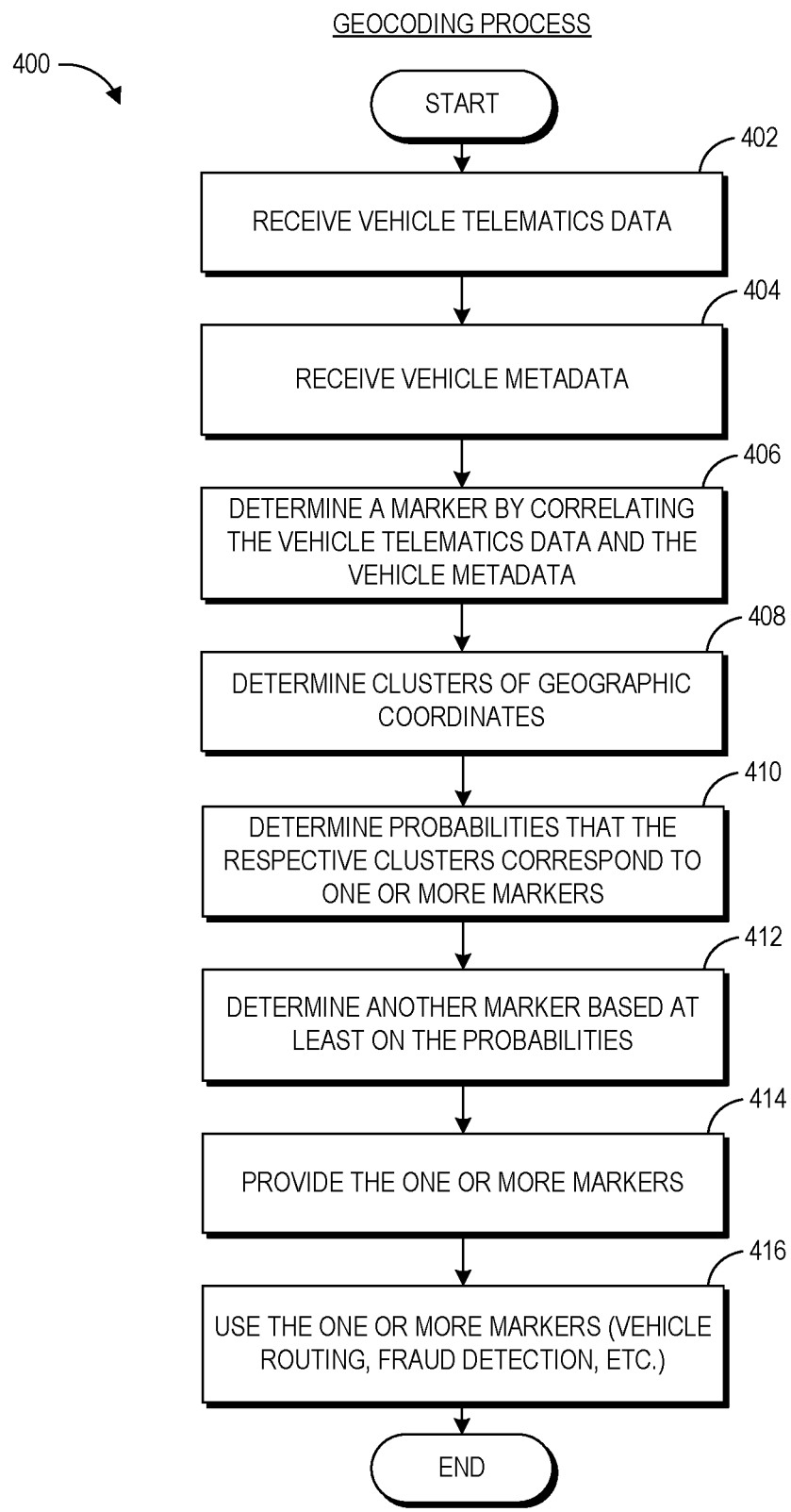
FIG. 4 illustrates an example geocoding process.

FIG. 4 depicts an example geocoding process 400. Process 400 illustrates an example mode of operation of the computing environment 100 of FIG. 1 and may be implemented by the various components shown in the computing environment 100. For convenience, the example process 400 is described in the context of the computing environment 100 but may instead be implemented by other systems described herein or other computing systems not shown. The process 400 provides an example approach by which the vehicle management system 110 can determine markers that include a location name and a geographic coordinate. Depending on the embodiment, the process of FIG. 4 may include fewer or additional blocks or the blocks may be performed in order different than is illustrated. For example, as described herein, some embodiments of the process 400 may include blocks 402, 404, and 406 to determine one or more markers, and yet other embodiments may alternatively include blocks 402, 404, 408, 410, and 412 to determine one or more markers.

At block 402, the telematics service 132 or the geocoding service 140 receives first data. Example first data includes vehicle telematics data or cellular data for multiple vehicles in a fleet of vehicles. The vehicle telematics data can include geographic coordinates, timestamps, or vehicle routes related to operation of one or more vehicles. As described herein, the vehicle telematics data may be collected via in-vehicle sensors (see, for example, FIGS. 1 and 2). For example, vehicle telematics data may be recorded by a Global Positioning System (GPS) device. One example format for a geographic coordinate may be a latitude-longitude pair. In some embodiments, a latitude-longitude pair refers to coordinates corresponding to latitude and longitude values at a given location. Example latitude-longitude pairs include (33.680925,−117.910767), (33.567717,−117.724686), etc. In the example, each geographic coordinate corresponds to a timestamp. As described herein, the geocoding service 140 may determine whether a corresponding vehicle or device is stationary or moving based on the geographic coordinates and the corresponding timestamps.

At block 404, the geocoding service 140 receives second data. Example second data includes vehicle metadata. As described herein, vehicle metadata may include delivery invoice data or invoices that further includes approximate vehicle stop timestamps and location names. In the example, some of the location names have a corresponding timestamp, which indicates an approximate time a vehicle or driver may have stopped at the respective location. Other examples of vehicle metadata include credit card transaction data, such as transaction data from the fuel card vendor, or wireless data, such as cellular data from a wireless phone provider.

In some embodiments, the first or second data is associated with a vehicle identifier, a type of vehicle, or metadata identifying a functional purpose of the vehicle. For example, the telematics data or the invoice data may be associated with a type of vehicle, such as a commuting vehicle or a shipping vehicle. Accordingly, the geocoding service 140 may identify particular vehicle types or functional purposes with geocoded data, as described herein. For example, one determined marker may be for a front entrance of a location based on commuter vehicle data and another determined marker may be for a different loading area where the same location based on shipping vehicle data.

At block 406, the geocoding service 140 determines a marker by correlating or determining an association between at least some of the first data and the second data. For example, the geocoding service 140 correlates the vehicle telematics data in the vehicle metadata. A marker may include a location name and a geographic coordinate corresponding to the surface of the earth. In some embodiments, the geocoding service 140 determines a first marker based on respective vehicle telematics data and vehicle metadata from multiple vehicles. For example, the vehicle metadata includes an approximate timestamp at a particular location name. The geocoding service 140 may determine a geographic coordinate from the vehicle telematics data by determining a correspondence between the vehicle metadata timestamp to the timestamp from the corresponding vehicle telematics data. In some embodiments, the geocoding service 140 determines a geographic coordinate from the telematics data from the nearest stop in time approximate to the metadata timestamp. In some embodiments, the geocoding service 140 determines a composite geographic coordinate based at least on two or more geographic coordinates, such as by taking the average of the two or more geographic coordinates, which is described in further detail with respect to FIG. 5. For example, the geocoding service 140 may process the vehicle telematics and metadata for multiple vehicles or drivers. The geocoding service 140 may generate a marker from the determined geographic coordinate and the corresponding location name.

An example of the geocoding service 140 correlating the first and second data includes determining a correspondence between a first timestamp and a second timestamp. As described herein, the second data includes metadata regarding one or more timestamps of when a vehicle, device, or driver approximately stopped at one or more location names. Accordingly, the geocoding service 140 can determine a correspondence between a first timestamp associated with a geographic coordinate and a second timestamp corresponding to an approximate stop time. Thus, the geocoding service 140 can associate the geographic coordinate with the location name based on the correspondence of the first and second timestamps.

An example of the geocoding service 140 determining correspondence between first and second timestamps includes determining, from multiple timestamps, that the first timestamp is sufficiently near to the second timestamp. For example, where the second timestamp corresponds to an approximate time when a vehicle, device, or driver approximately stopped at one or more location names, the geocoding service 140 may select the first timestamp over a third timestamp where the first timestamp is closer in time to the second timestamp than the third timestamp, where the first and third timestamps are both associated with the geographic data, such as being from vehicle telematics data. In the example, the geocoding service 140 determines a first difference in time between the second timestamp and the first timestamp, and a second difference in time between a third timestamp and the first timestamp. The geocoding service 140 may then select the first timestamp, over the third timestamp, based on the first difference in time being less than the second difference in time. In some examples, the geocoding service 140 selects the timestamp (which is associated with a geographic coordinate) that is nearest in time to the approximate vehicle timestamp (from the metadata). In another example, determining the correspondence between the second timestamp and the first timestamp includes: (1) determining a difference in time between the second timestamp and the first timestamp; and (2) determining that the difference in time is within a time threshold or a predetermined time threshold. For example, the geocoding service 140 may determine a correspondence between two timestamps based on the timestamps being within a threshold period of time, such as 1, 5, or 10 minutes, for example.

In some embodiments, at blocks 408, 410, or 412, the geocoding service 140 may determine markers for location names that do not have a corresponding stop entry in the vehicle metadata as described herein.

At block 408, the geocoding service 140 determines clusters of geographic coordinates. For example, the geocoding service 140 may use the vehicle telematics data to determine clusters of stop locations. In some embodiments, the example geocoding service 140 recursively or in a dynamic manners determines clusters until the clusters are sufficiently apart (such as based on a distance threshold value or a predetermined distance threshold value). Additional or alternative methods for determining clusters of geographic coordinates is described in further detail with respect to blocks 502 and 606 of FIG. 6. In some embodiments, a particular cluster of geographic coordinates may include a single geographic coordinate.

At block 410, the geocoding service 140 determines probabilities for the clusters of geographic coordinates. The probabilities associated with the clusters of geographic coordinates may indicate a likelihood that a particular cluster corresponds to a marker. For example, if there are seven markers on a particular vehicle route, a particular cluster may have seven different probabilities corresponding to each of the seven markers on the particular vehicle route. Determining probabilities of clusters is described in further detail with respect to block 608 of FIG. 6.

At block 412, the geocoding service 140 determines another marker based at least on the probabilities for the clusters of geographic coordinates. In some embodiments, multiple markers may be mapped to the same cluster of geographic coordinates based at least on the respective probabilities of a marker to a cluster of geographic coordinates. Accordingly, the geocoding service 140 may execute a matching algorithm to resolve a conflict of two or more markers that correspond to the same cluster of geographic coordinates based on the probabilities. For example, the geocoding service 140 may execute a matching algorithm for X number of clusters corresponding to X markers where each cluster is associated with X number of discrete probability values. An example matching algorithm that may be used by the geocoding service 140 is a Gale-Shapley algorithm. In some embodiments, the geocoding service 140 assigns a cluster to a marker based at least on the probabilities. Determining a marker based at least on the probabilities is described in further detail respect to block 608 of FIG. 6, and FIGS. 7A-7D, 8, 9A, and 9B.

At block 414, the geocoding service 140 provides the one or more markers determined at blocks 406 or 412. For example, the geocoding service 140 may provide the one or more markers to other services of the vehicle management system 110 such as the routing service 112, the mapping service 114, the dispatch service 124, or directly to a vehicle via the in-vehicle device. Examples of the geocoding service 140 providing the one or more markers are the geocoding service 140 outputting or transmitting the one or more markers to another service or directly to a vehicle via the in-vehicle device.

At block 416, the geocoding service 140 may use the one or more markers. For example, the markers may be used for vehicle routing. Additionally or alternatively, the geocoding techniques described herein may advantageously determine markers for geographic locations for specific functional purposes or that are of particular use to a fleet of vehicles but where the geographic locations may not be readily available, of poor quality, or costly to purchase from an external vendor. As an example, the determined markers may correspond to service trashcans.

The determination or use of one or more markers may be intrinsically tied to computer technology. In the vehicle routing example, a marker may be part of a data structure that includes stop locations where the data structure can be processed to automatically determine routes for a vehicle. Additional or alternative example uses for the determined or generated markers include creating routes with the markers, updating map data structures with the markers, revising previously-created routes with the markers, or reassigning drivers or vehicles to new routes with the markers. In the vehicle routing context, routing of vehicles may be a combinatorial optimization and integer programming problem to determine an optimal or near-optimal set of routes for a fleet of vehicles to traverse in order to deliver to a given set of destinations. Algorithms for determining vehicle routes, such as vehicle flow formulations, commodity flow formulations, or set partitioning approaches, may use the determined one or more markers for route determination and be intrinsically tied to computer technology.

In some embodiments, the determined markers may be used for improved fraud detection. For example, a stop location may correspond to a refueling station, such as a gas station. Refueling fraud occurs when a driver fuels another vehicle, such as their personal vehicle, as opposed to their assigned the vehicle. Accordingly, if the determined marker corresponds to a refueling station, then the determined marker may be used by the geocoding service 140 (or any other service or device described herein) to verify that the fleet vehicle was refueled at the determined marker according to the vehicle metadata, such as the credit card transaction report.

Other example uses for the determined markers can include: (i) adjusting one or more settings (for instance, modes of operation, data gathering approaches, sensor sensitivities, or the like) of the vehicle management system 110, the component of the vehicle, or the telematics-generating component, (ii) installing updated routing or mapping software with the determined markers on the vehicle management system 110, the component of the vehicle, or the telematics-generating component, (iii) resetting a component of the vehicle or the telematics-generating component, (iv) displaying a message on a screen of an in-vehicle device 104 associated with a marker, (v) adjusting a routing schedule for a vehicle associated with the measurements and values thereof (for instance, adjusting a route determined by the routing service 112 to add a maintenance service stop corresponding to a marker in place of one or more previously assigned delivery stops and reassign the one or more previously assigned delivery stops to another vehicle), (ix) ordering a new part for the vehicle management system 110, the component of the vehicle, or the telematics-generating component to be sent to a marker, or (x) scheduling a maintenance appointment for a vehicle or driver at a particular marker.

VI. Geographic Coordinate Determination Process

Figure 5:
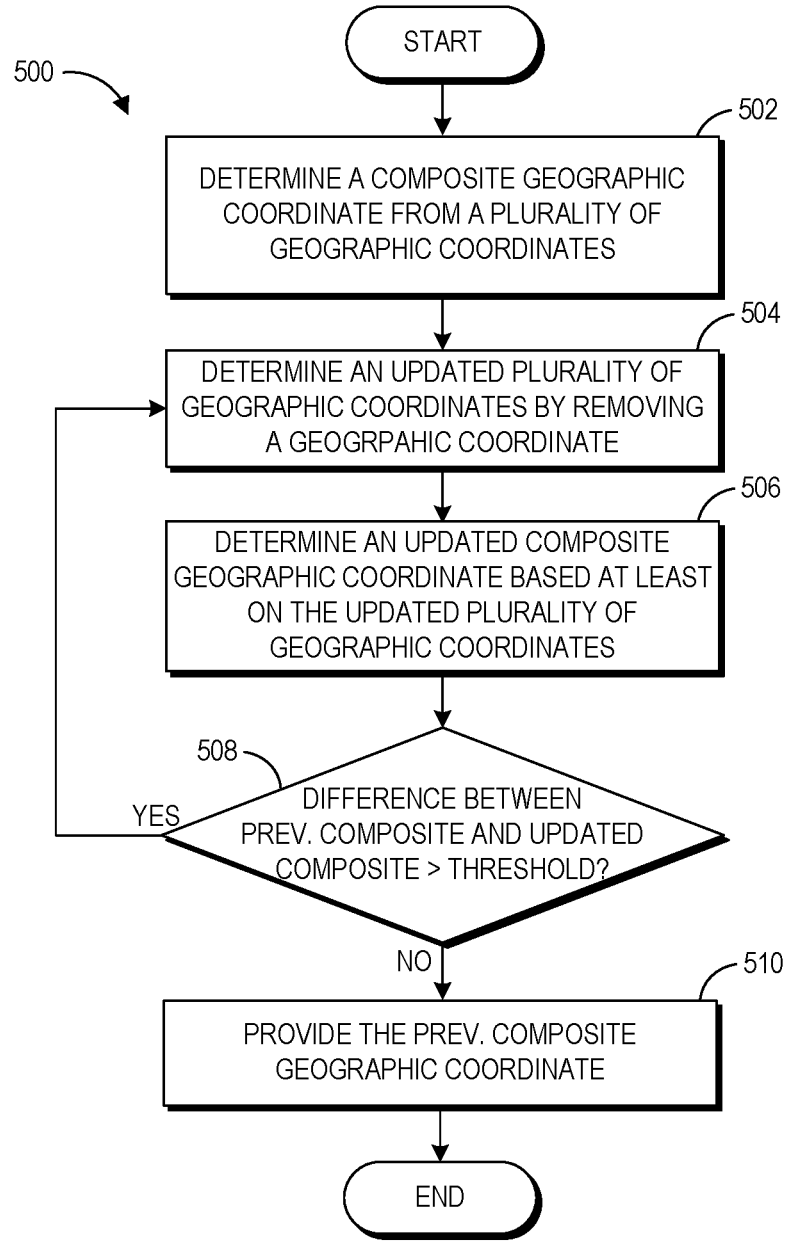
FIG. 5 illustrates an example geographic coordinate determination process.

FIG. 5 depicts an example geographic coordinate determination process 500. The process 500 illustrates an example mode of operation of the computing environment 100 of FIG. 1 and may be implemented by the various components shown in the computing environment 100. For convenience, the example process 500 is described in the context of the computing environment 100 but may instead be implemented by other systems described herein or other computing systems not shown. The process 500 provides an example approach by which the vehicle management system 110 can determine a composite geographic coordinate based at least on two or more geographic coordinates. Depending on the embodiment, the process of FIG. 5 may include fewer or additional blocks or the blocks may be performed in order different than is illustrated.

At block 502, the geocoding service 140 determines a composite geographic coordinate from a plurality of geographic coordinates. For example, the geocoding service 140 may determine a plurality of geographic coordinates associated with a marker from vehicle metadata and the vehicle telematics data, such as described above with respect to block 406. The geocoding service 140 may determine a composite geographic coordinate using one or more statistical measures, such as by determining an average geographic coordinate from the plurality of geographic coordinates. In the example, the average geographic coordinate may correspond to an average latitude-longitude pair from the set of latitude-longitude pairs associated with marker.

At block 504, the geocoding service 140 determines an updated plurality of geographic coordinates by removing a geographic coordinate. For example, the geocoding service 140 may determine a geographic coordinate from the plurality of geographic coordinates used in block 502 that is the furthest from the composite geographic coordinate determined at block 502. Accordingly, the furthest geographic coordinate is removed from the plurality of geographic coordinates. In other embodiments, the geocoding service 140 uses an alternative method of removing a geographic morning from the plurality of geographic coordinates. For example, the geocoding service 140 may select a geographic coordinate randomly or pseudo-randomly and remove it from the plurality of geographic coordinates.

At block 506, the geocoding service 140 determines an updated composite geographic coordinate based at least on the updated plurality of geographic coordinates. For example, the geocoding service 140 may execute the same statistical measure performed at block 502 to the updated plurality of geographic coordinates. In the example, the updated plurality of geographic coordinates includes a set of latitude-longitude pairs. Continuing with the example, the updated composite geographic coordinate corresponds to an average latitude-longitude pair of the updated plurality of geographic coordinates.

At block 508, the geocoding service 140 compares the composite geographic coordinate determined at block 502 to the updated positive geographic coordinate determined at block 506. For example, the geocoding service 140 compares the previous and updated composite geographic coordinates to determine whether the difference between the previous and updated ordinance exceeds a threshold, such as a percentage threshold, a predetermined percentage threshold, or some other value. Accordingly, the geocoding service 140 returns to block 504 if the difference between the coordinates exceeds the threshold. For example, if the difference between the previous and the updated coordinates changes by more than five percent (or some other value), then the geocoding service 140 will continue repeating the loop. Otherwise, the geocoding service 140 proceeds to block 510.

At block 510, the geocoding service 140 provides the previous composite geographic coordinate. For example, the geocoding service 140 may provide previous composite geographic coordinate to other services of the vehicle management system 110 such as the routing service 112, the mapping service 114, the dispatch service 124, or directly to a vehicle via the in-vehicle device.

In some embodiments, an execution of the processes described in FIGS. 4 and 5 may correspond to the following example. The geocoding service 140 matches a driver's stop in the vehicle metadata to the nearest stop in time from the vehicle telematics data approximate to the vehicle metadata's stop time. For example, the geocoding service 140 may use a predetermined time threshold to determine the nearest geographic coordinate. In one example, if the geocoding service 140 determines that the vehicle metadata time is within ten minutes of a stop in the vehicle telematics data, then the geocoding service 140 will use the geographic coordinate of the stop in the vehicle telematics data. The geocoding service 140 may repeat this process for multiple drivers' vehicle metadata. At the end, a marker from one or more markers may have a set of geographic coordinates that are associated with the particular marker. Subsequently, the geocoding service 140 determines an average latitude-longitude pair from multiple latitude-longitude pairs associated with the marker. The geocoding service 140 may remove latitude-longitude pairs that are the furthest from the average from the data set until the average doesn't significantly change. Afterwards, if enough points are remaining, the geocoding service 140 re-averages the data set and records the new marker to the re-averaged latitude-longitude pair.

VII. Geographic Coordinate Determination Process

Figure 6:
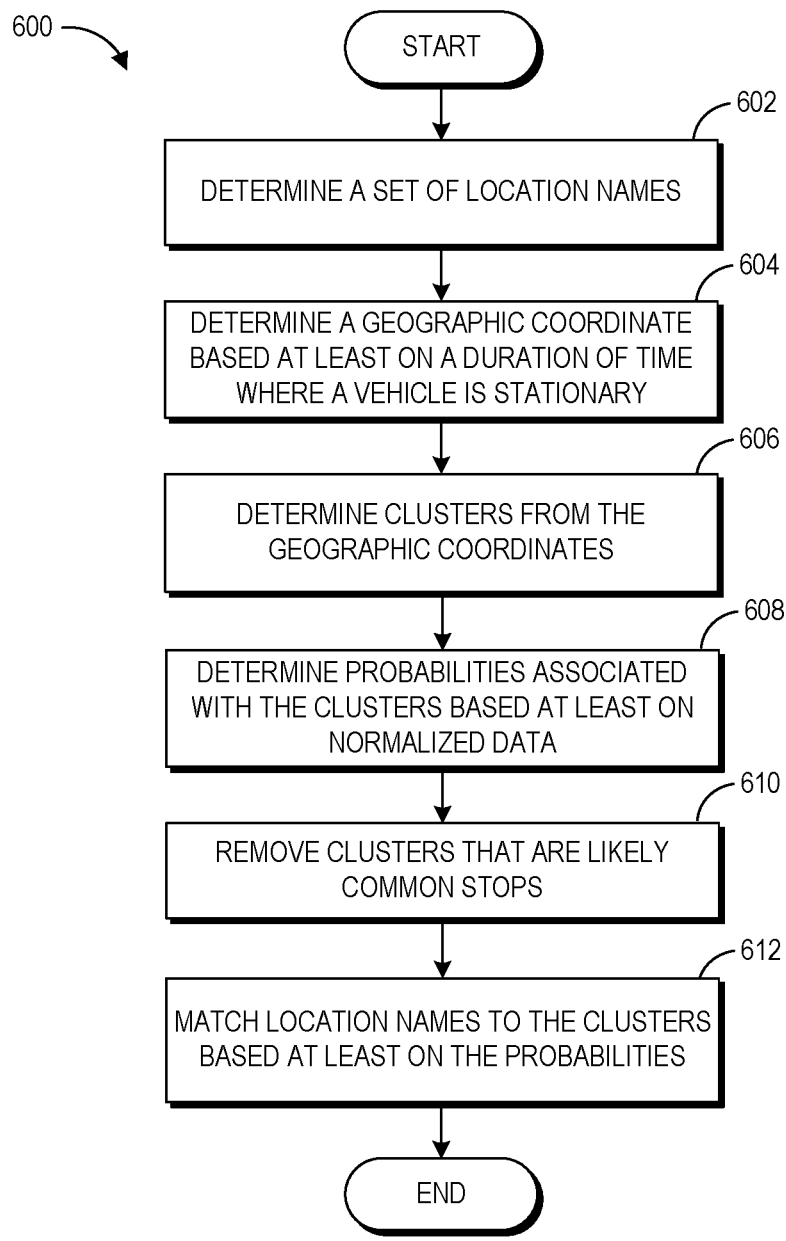
FIG. 6 illustrates an example marker determination process.

FIG. 6 depicts an example marker determination process 600. The process 600 illustrates an example mode of operation of the computing environment 100 of FIG. 1 and may be implemented by the various components shown in the computing environment 100. For convenience, the example process 600 is described in the context of the computing environment 100 but may instead be implemented by other systems described herein or other computing systems not shown. The process 600 provides an example approach by which the vehicle management system 110 can determine a marker based at least on vehicle telematics data. In some embodiments, the example process 600 may be useful where there is incomplete vehicle metadata (such as a stop time not being recorded on a driver invoice). Depending on the embodiment, the process of FIG. 6 may include fewer or additional blocks or the blocks may be performed in order different than is illustrated.

At block 602, the geocoding service 140 determines or receives a set of location names. For example, the geocoding service 140 may determine location names (which may eventually be assigned to geographic coordinates as markers) from vehicle metadata such as one or more drive invoices. In other embodiments, location names may be determined based on addresses or other metadata provided by an external source such as the company that operates the fleet of vehicles. In some embodiments, each location from the set of location names corresponds to a discrete physical location.

At block 604, the geocoding service 140 determines a geographic coordinate based at least on a duration of time where vehicle is stationary. For example, the geocoding service 140 determines stop locations from the vehicle telematics data that indicates a vehicle has not moved for duration of time. Example durations of time include five or ten minutes of a vehicle remaining stationary or parked. For example, the geocoding service 140 receives geographic coordinates and timestamps associated with the geographic coordinates, such as the geographic and timestamp data from telematics data. Accordingly, the geocoding service 140 has a time series of geographic coordinates, and determining whether an associated vehicle or device is stationary can be determined from the geographic coordinate for the corresponding vehicle or device not changing for a period of time. Additionally or alternatively, cellular data may be used by the geocoding service 140 to determine one or more geographic coordinates.

At block 606, the geocoding service 140 determines clusters from the geographic coordinates. For example, the geocoding service 140 may determine clusters of the stopping geographic coordinates from block 604 by grouping the coordinates within a distance from one another, such as a predetermined radius of 200 feet for example. Additionally or alternatively, the geocoding service 140 determines clusters by adding a geographic coordinate to the cluster until the determined one or more clusters are sufficiently far apart such as based on a predetermined distance threshold value). In some embodiments, the geocoding service 140 uses one or more known clustering algorithms, such as K-means, fuzzy C-means, hierarchal clustering, or a probabilistic clustering algorithm, such as a Gaussian mixture model.

An example of the geocoding service 140 determining a cluster includes determining a subset of geographic coordinates that correspond to stops. For example, block 604 describes the geocoding service 140 determining geographic coordinates that correspond to a stationary or stopped vehicle or device. Additionally or alternatively, the geocoding service 140 determines a distance between two geographic coordinates, and if the distance is within a distance threshold, the geocoding service 140 generates a cluster from the two geographic coordinates. The geocoding service 140 may add an additional geographic coordinate to the cluster if the geographic coordinate is within a distance threshold from a point within the cluster, such as a center point of the cluster.

At block 608, the geocoding service 140 determines probabilities associated with the clusters. For example, the geocoding service 140 may increase a marker count by one for each vehicle metadata, such as driver invoice, for a particular day. The geocoding service 140 may process multiple days of a particular driver's history for multiple drivers. The geocoding service 140 may then normalize this data based at least on the number of stops by drivers at a cluster, total number of stops, or total number of location names or markers. For example, the number of stops at a particular location may be divided by the total number of stops at that location. This example normalization may be described in further detail with respect to FIGS. 7A-7D.

In the invoice example, the geocoding service 140 determines a first number of invoices associated with a cluster and a location name. Continuing with the example, the geocoding service 140 determines a total number of invoices associated with the cluster. The geocoding service 140 can determine a probability based at least on the first number and the total number. For example, the probability substantially corresponds to the first number divided by the total number. Additionally or alternatively, the probability substantially may correspond to A=T/S*C, where T corresponds to the first number, S corresponds to the total number, and C corresponds to a total number of location names associated with the cluster. Additional details and examples regarding determining probabilities is described in further detail with respect to FIGS. 7A-7D.

At block 610, the geocoding service 140 may remove a cluster based at least on a likelihood that the cluster is a common stop. For example, the geocoding service 140 may determine from the compiled data that a particular cluster is likely a location where a vehicle starts and begins every day, such as a vehicle depot, or is a common mid-day stop, such as a rest stop. Accordingly, the geocoding service 140 removes the common stop from the clusters to efficiently determine markers that are destinations of interest. Additional information regarding removing common stops is described in further detail with respect to FIG. 8.

At block 612, the geocoding service 140 matches the location names to the clusters based at least on the probabilities to determine one or more markers. For example, the geocoding service 140 matches location names to clusters with a matching algorithm. Example matching algorithms that may be used by the geocoding service 140 includes a stable-marriage matching algorithm, such as a Gale-Shapley algorithm. For example, the geocoding service 140 assigns every marker to the cluster with the highest probability. The geocoding service 140 provisionally accepts any cluster with exactly one proposal. If a cluster has more than one proposal, the geocoding service 140 selects the suitor highest on the cluster's list. Any rejected marker proposes to the next cluster on the marker's list. Again, any cluster with more than one suitor accepts the highest on the cluster's list. The geocoding service 140 continues executing the matching algorithm until every marker has been accepted or has been rejected by every cluster on the marker's list, at which point each marker-cluster pair is finally assigned. Further detail regarding an example matching algorithm is described in further detail with respect to FIG. 9.

VIII. Geocoding Examples

FIGS. 7A-7D are example representations of data that is used or generated during an example geocoding process. For example, FIG. 7 may correspond to blocks 408, 410, 412 of FIG. 4 or blocks 602, 604, 606, and 608 of FIG. 6, or some combination thereof.

Figure 7A:
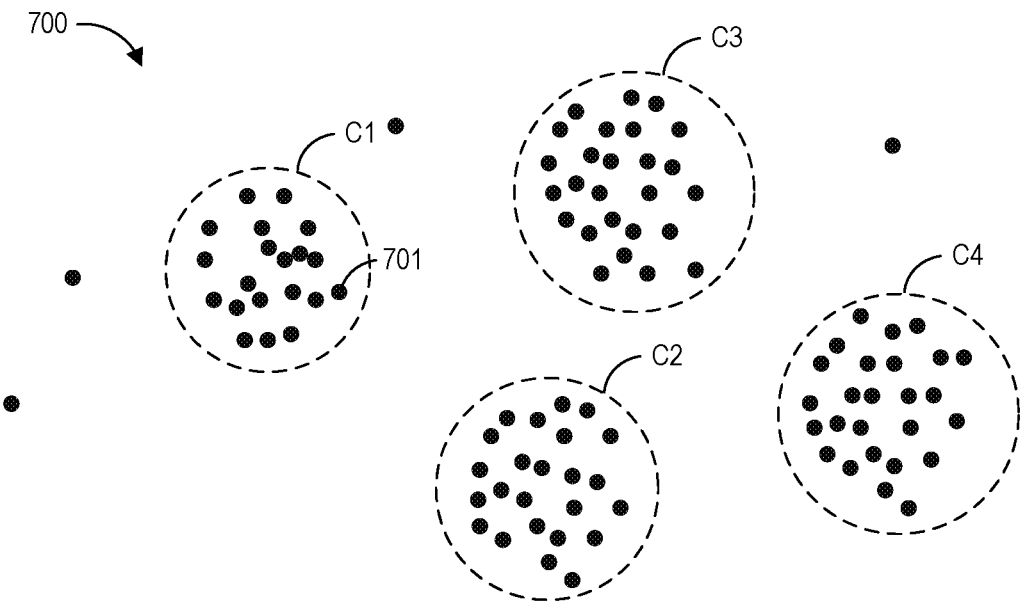

FIG. 7A illustrates example clusters determined by the geocoding service 140. The example data environment 700 includes one or more geographic coordinates 701 and clusters C1, C2, C3, and C4. The one or more geographic coordinates may correspond to vehicle-related data such as GPS data or cellular data. The geocoding service 140 may use the clustering techniques described herein or other known techniques in the art for clustering coordinates, as illustrated by the clusters C1, C2, C3, and C4. The generation or determination of the clusters C1, C2, C3, and C4 from vehicle-related data may correspond to block 408 FIG. 4 or blocks 604 or 606.

Figure 7B:
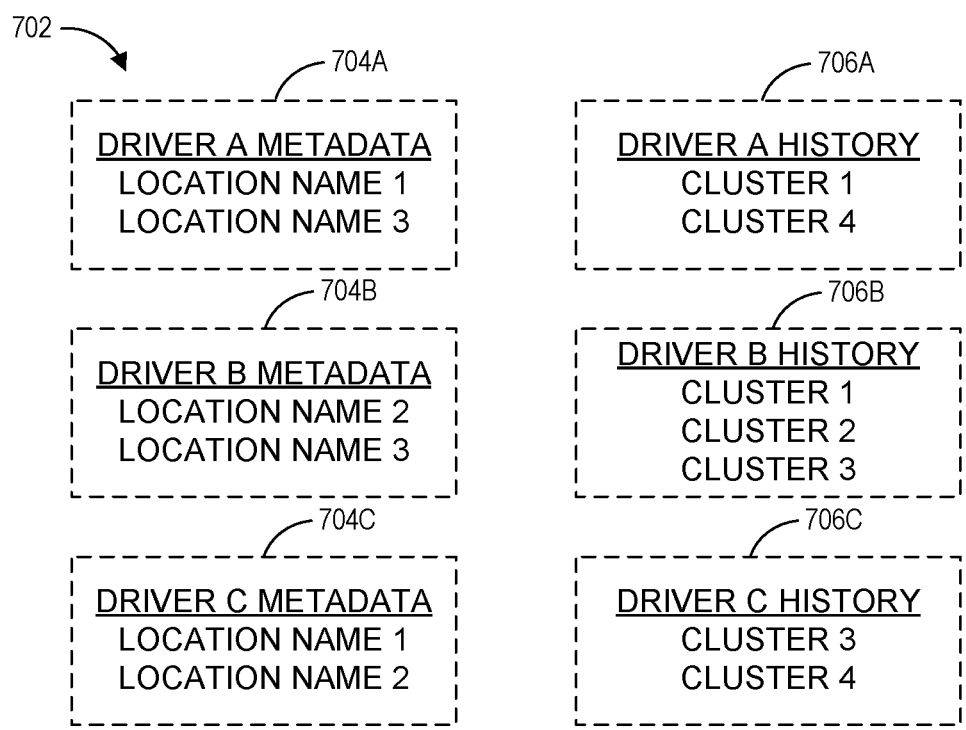

FIG. 7B illustrates example metadata and data associated with one or more drivers or vehicles. The example data environment 702 includes location metadata 704A, 704B, and 704C, and data 706A, 706B, and 706C. The example metadata 704A indicates that a particular driver or vehicle is associated with the location names 1 and 3. The example metadata 704A, 704B, and 704C corresponds to the locations names from one or more invoices. The example data 706A indicates that the same particular drive or vehicle is associated with clusters 1 and 4, which may correspond to the clusters C1 and C4 of FIG. 7A, respectively. Accordingly, the example driver A or vehicle is associated with the geographic coordinate clusters C1 and C4 of FIG. 7A. For example, the geocoding service 140 may associate a vehicle, driver, or device with a cluster by determining, from its respective geographic data (which may be associated with timestamp data), that a geographic coordinate for the particular vehicle, driver, or device us within the respective cluster.

FIGS. 7C and 7D illustrate example steps to generate data for a matching algorithm. In FIG. 7C, the data environment 710 includes a data table 712A. The example table 712A of FIG. 7C illustrates data after metadata Driver A or a corresponding vehicle has been processed by the geocoding service 140. In the example table 712A, the location names from a driver's vehicle metadata may be correlated to the driver's cluster history in the example rows and columns. In FIG. 7D, the data environment 710 includes an updated data table 712B. The example table 712B of FIG. 7D illustrates data following the processing of multiple drivers and a further normalization of the data. The generation or determination of data may correspond to block 410 FIG. 4 or block 608 of FIG. 6.

For example, the probabilities shown in the updated data table 712B may correspond to the formula:

$$A = \frac{T}{S} * C.$$

Where T corresponds to a number of visits by one or more drivers or vehicles to a cluster or a number of invoices associated with a cluster and a location name. S corresponds to a sum of the total number of visits in that column or a total number of invoices associated with the cluster. C corresponds to the total number of location names or markers associated with a particular cluster of geographic coordinates. As described herein, the association between a marker and a particular cluster of geographic coordinates may be determined based at least on vehicle-related data from one or more vehicles.

In the example table 712B of FIG. 7D, T/S for Cluster 1 and Location Name 1 is ¼. In the example data environment 702 of FIG. 7B, the particular metadata 704A and the data 706A indicates that Cluster 1 and Location Name 1 are associated and that there is one particular metadata 704A (such as an invoice) associated with Cluster 1 and Location Name 1, which corresponds to T. Similarly, T for Cluster 1 and Location Name 2 is 1 based on the metadata 704B and the data 706A. T for Cluster 1 and Location Name 3 is 2 based on the metadata 704A and 704B and the data 706A and 706B. In the example, S, for each respective entry within the Cluster 1 column, is the sum of each T within the column (here 1+1+2=4). Within the Cluster 1 column, C is 3 because each of Location Names 1, 2, and 3 are associated with Cluster 1 based on the metadata 704A and 704B and the data 706A and 706B.

In the example table 712B of FIG. 7D, the highlighted row and column intersections may indicate the results of a matching algorithm. For example, the highlighted probability values indicate match location names with clusters based on the probability values. In the particular example, Location Name 3 is matched with Cluster 1, Location name 2 is matched with Cluster 3, and Location name 1 is matched with Cluster 4, which may be according to a matching algorithm described herein.

Figure 8:
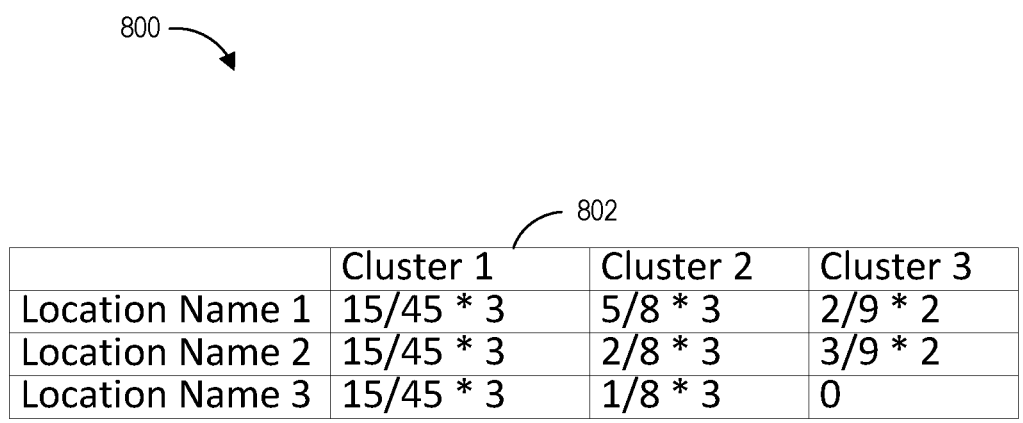
FIG. 8 illustrates another example representation of geocoding data.

FIG. 8 is an example representation of additional or alternative data that is generated during an example geocoding process. For example, FIG. 8 may correspond to block 610 of FIG. 6. FIG. 8 illustrates an example table 802 where Cluster 1 is a frequent stop amongst all of the markers. Accordingly, the geocoding service 140 may determine that Cluster 1 is a common stop and may remove Cluster 1 from the list of clusters.

FIGS. 9A and 9B are example representations of additional or alternative data that is generated during an example geocoding process. For example, FIGS. 9A and 9B may correspond to block 612 of the example geocoding process of FIG. 6, such as the execution of a Gale-Shapley algorithm.

In FIG. 9A, the example data environment 900 includes a data table 902A. The example table 902A illustrates Cluster 1 as the highest probability for each of Location Names 1-3, which represents a conflict. In FIG. 9B, the example data environment 900 includes an updated data table 902B. Further processing of the algorithm by the geocoding service 140 may result in each marker being assigned to a respective cluster as illustrated in the example table 902B according to a matching algorithm, such as a Gale-Shapley algorithm. Accordingly, each of Clusters 1, 2, and 3 are assigned to a respective location name, such as Location Names 1, 2, and 3 to determine likely geocoded data for the locations.

IX. Terminology

Any of the systems and processes described herein can be performed in real time or near real-time. As used herein, the term "real-time" and the like, in addition to having its ordinary meaning, can mean rapidly or within a certain expected or predefined time interval, and not necessarily immediately. For instance, real-time may be within a few seconds, few minutes, or 5 minutes, or 10 minutes, or some other short period of time after a triggering event.

A number of computing systems have been described throughout this disclosure. The descriptions of these systems are not intended to limit the teachings or applicability of this disclosure. For example, the user systems described herein can generally include any computing device(s), such as desktops, laptops, video game platforms, television set-top boxes, televisions (e.g., internet TVs), computerized appliances, and wireless mobile devices (e.g. smart phones, PDAs, tablets, or the like), to name a few. Further, it is possible for the user systems described herein to be different types of devices, to include different applications, or to otherwise be configured differently. In addition, the user systems described herein can include any type of operating system ("OS"). For example, the mobile computing systems described herein can implement an Android™ OS, a Windows® OS, a Mac® OS, a Linux or Unix-based OS, or the like.

Further, the processing of the various components of the illustrated systems can be distributed across multiple machines, networks, and other computing resources. In addition, two or more components of a system can be combined into fewer components. For example, the various systems described herein can be distributed across multiple computing systems, or combined into a single computing system. Further, various components of the illustrated systems can be implemented in one or more virtual machines, rather than in dedicated computer hardware systems. Likewise, the data repositories shown can represent physical or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Depending on the embodiment, certain acts, events, or functions of any of the algorithms, methods, or processes described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Each of the various illustrated systems may be implemented as a computing system that is programmed or configured to perform the various functions described herein. The computing system may include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computing system includes multiple computing devices, these devices may, but need not, be co-located. The results of the disclosed methods and tasks may be persistently stored by transforming physical storage devices, such as solid state memory chips or magnetic disks, into a different state. Each process described may be implemented by one or more computing devices, such as one or more physical servers programmed with associated server code.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements or states. Thus, such conditional language is not generally intended to imply that features, elements or states are in any way required for one or more embodiments or that one or more embodiments necessarily include logic for deciding, with or without author input or prompting, whether these features, elements or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a" and "an" are to be construed to mean "one or more" or "at least one" unless specified otherwise.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While the above detailed description has shown, described, and pointed out novel features as applied to various embodiments, it will be understood that various omissions, substitutions, and changes in the form and details of the devices or algorithms illustrated can be made without departing from the spirit of the disclosure. Thus, nothing in the foregoing description is intended to imply that any particular feature, characteristic, step, module, or block is necessary or indispensable. As will be recognized, the processes described herein can be embodied within a form that does not provide all of the features and benefits set forth herein, as some features can be used or practiced separately from others.

What is claimed is:

1. A method, comprising:
   receiving, by a device, vehicle telematics data associated with a plurality of vehicles,
      wherein the vehicle telematics data includes a plurality of geographic coordinates and a plurality of first timestamps;
   determining, by the device, and based on the plurality of geographic coordinates and the plurality of first timestamps, whether the plurality of vehicles have been stationary for a period of time;
   obtaining, by the device, vehicle metadata associated with the plurality of vehicles from a plurality of invoices,
      wherein the vehicle metadata includes information associated with delivered items included in the plurality of invoices,
      wherein the plurality of invoices include information associated with a plurality of second timestamps related to the delivered items and a plurality of location names related to the delivered items, and
      wherein the plurality of second timestamps indicate approximate times at which respective vehicles, of the plurality of vehicles, were stopped at locations corresponding to the plurality of location names;
   determining, by the device, whether a first timestamp, of the plurality of first timestamps, corresponds to any of the plurality of second timestamps associated with a same vehicle as the first timestamp;
   determining, by the device and based on determining that the first timestamp is uncorrelated to any of the plurality of second timestamps associated with the same vehicle as the first timestamp, a cluster based on the plurality of geographic coordinates;
   determining, by the device, a plurality of probabilities for the cluster,
      wherein the plurality of probabilities indicate a likelihood that the cluster corresponds to a location name of the plurality of location names, and
      wherein the plurality of probabilities are based on:
         a quantity of invoices, of the plurality of invoices, associated with the cluster and the location name;
   assigning, by the device, a first marker to the cluster based on the plurality of probabilities; and
   transmitting, by the device, the first marker to a vehicle of the plurality of vehicles.

2. The method of claim 1, wherein the vehicle telematics data includes data associated with in-vehicle sensors associated with the plurality of vehicles.

3. The method of claim 1, wherein each geographic coordinate, of the plurality of geographic coordinates, corresponds to a respective timestamp of the plurality of first timestamps.

4. The method of claim 1, wherein the first marker is a stop on a route to be traveled by the vehicle.

5. The method of claim 1, further comprising:
   matching each location name, of the plurality of location names, to a respective cluster based on a stable-marriage matching algorithm.

6. The method of claim 5, wherein the stable-marriage matching algorithm comprises a Gale-Shapley algorithm.

7. A device, comprising:
   one or more memories; and
   one or more processors, communicatively coupled to the one or more memories, configured to:
      receive first data associated with a plurality of vehicles,
         wherein the first data includes a plurality of geographic coordinates and a plurality of first timestamps;
      determine, based on the plurality of geographic coordinates and the plurality of first timestamps, whether the plurality of vehicles have been stationary for a period of time;
      obtain second data associated with the plurality of vehicles from a plurality of invoices,
         wherein the second data is associated with a plurality of second timestamps related to delivered items and a plurality of location names related to delivered items, and
         wherein the plurality of second timestamps indicate an approximate time at which respective vehicles, of the plurality of vehicles, were stopped at locations corresponding to the plurality of location names;
      determine whether a first timestamp, of the plurality of first timestamps, corresponds to any of the plurality of second timestamps associated with a same vehicle as the first timestamp;
      determine, based on determining that the first timestamp is uncorrelated to any of the plurality of second timestamps associated with the same vehicle as the first timestamp, a cluster based on the plurality of geographic coordinates;
      determine a plurality of probabilities for the cluster,
         wherein the plurality of probabilities indicate a likelihood that the cluster corresponds to a particular location name of the plurality of location names, and
         wherein the plurality of probabilities are based on:
            a first quantity of invoices associated with the cluster, and
            a second quantity of invoices associated with each particular location name;
      assign a first marker to the cluster based on the plurality of probabilities; and
      transmit the first marker to a vehicle of the plurality of vehicles.

8. The device of claim 7, wherein respective vehicles, of the plurality of vehicles, are determined to be stopped based on at least a duration of time where a geographic coordinate, of the plurality of geographic coordinates, is constant.

9. The device of claim 8, wherein a first geographic coordinate, of the plurality of geographic coordinates, is grouped with a second geographic coordinate, of the plurality of geographic coordinates, based on a predetermined distance between the first geographic coordinate and the second geographic coordinate.

10. The device of claim 7, wherein the first data includes data associated with in-vehicle sensors associated with the plurality of vehicles.

11. The device of claim 7, wherein each geographic coordinate, of the plurality of geographic coordinates, corresponds to a respective first timestamp of the plurality of first timestamps.

12. The device of claim 7, wherein each invoice, of the first quantity of invoices and the second quantity of invoices, is associated with a respective second timestamp of the plurality of second timestamps.

13. The device of claim 7, wherein the first marker is a stop on a route to be traveled by the vehicle.

14. A non-transitory computer-readable medium storing instructions, the instructions comprising:
one or more instructions, when executed by one or more processors, cause the one or more processors to:
receive first data associated with a plurality of vehicles, wherein the first data includes a plurality of geographic coordinates and a plurality of first timestamps;
determine, based on the plurality of geographic coordinates and the plurality of first timestamps, whether the plurality of vehicles have been stationary for a period of time;
obtain second data associated with the plurality of vehicles from a plurality of invoices,
wherein the second data is associated with a plurality of location names related to delivered items and a plurality of second timestamps related to delivered items, and
wherein the plurality of second timestamps indicate approximate times at which respective vehicles, of the plurality of vehicles, were stopped at locations corresponding to the plurality of location names;
determine whether a first timestamp, of the plurality of first timestamps, corresponds to any of the plurality of second timestamps associated with a same vehicle as the first timestamp;
determine, based on determining that the first timestamp is uncorrelated to any of the plurality of second timestamps associated with the same vehicle as the first timestamp, a cluster based on the plurality of geographic coordinates;
determine a plurality of probabilities for the cluster,
wherein the plurality of probabilities indicate a likelihood that the cluster corresponds to a particular location name of the plurality of location names, and
wherein the plurality of probabilities are based on:
a first quantity of invoices associated with the cluster, and
a second quantity of invoices associated with each particular location name;
assign a first marker to the cluster based on the plurality of probabilities; and
transmit the first marker to a vehicle of the plurality of vehicles.

15. The non-transitory computer-readable medium of claim 14, wherein the first data includes data associated with in-vehicle sensors associated with the plurality of vehicles.

16. The non-transitory computer-readable medium of claim 14, wherein each geographic coordinate, of the plurality of geographic coordinates, corresponds to a respective first timestamp of the plurality of first timestamps.

17. The non-transitory computer-readable medium of claim 14, wherein each invoice, of the first quantity of invoices and the second quantity of invoices, is associated with a respective second timestamps of the plurality of second timestamps.

18. The non-transitory computer-readable medium of claim 14, wherein the one or more instructions, when executed by the one or more processors, further cause the one or more processors to:
match each location name of the plurality of location names to a respective cluster based on a stable-marriage matching algorithm.

19. The method of claim 1, wherein the vehicle telematics data and the vehicle metadata include vehicle identifiers associated with the plurality of vehicles, identify types of the plurality of vehicles, or identify functional purposes of the plurality of vehicles.

20. The method of claim 1, wherein determining whether the plurality of vehicles have been stationary comprises:
determining, based on the plurality of first timestamps and the plurality of geographic coordinates, that a particular geographic coordinate, of the plurality of geographic coordinates, associated with a particular vehicle, of the plurality of vehicles, have been constant for the period of time; and
determining, based on determining that the particular geographic coordinate has been constant for the period of time, that the particular vehicle was stopped at a particular location associated with the particular geographic coordinate.

* * * * *